Aug. 17, 1937.  F. KAPPREL  2,090,420
LOCOMOTIVE CAB AND CURTAIN STRUCTURE
Original Filed Aug. 27, 1934  3 Sheets-Sheet 1

INVENTOR.
Frank Kapprel
Alfred R. Fuchs
ATTORNEY.

Patented Aug. 17, 1937

2,090,420

UNITED STATES PATENT OFFICE 2,090,420

LOCOMOTIVE CAB AND CURTAIN STRUCTURE

Frank Kapprel, Kansas City, Mo.

Original application August 27, 1934, Serial No. 741,605. Divided and this application September 30, 1936, Serial No. 103,470. In Canada January 29, 1936

18 Claims. (Cl. 105—9)

My invention relates to enclosures for locomotives, and more particularly to a hood and curtain arrangement to be used in conjunction with a locomotive cab and apron to provide an enclosure rearwardly of the cab, designed to increase the safety of operation of the locomotive and the comfort and efficiency of the crew.

The railroads of the United States are subject to the very strict rules and regulations of the Interstate Commerce Commission, these rules covering every important part of a locomotive and its condition. One of these rules provides that for five months of the year, that is, the cold, or winter, months, all locomotives operating in approximately the northern half of the United States must have means for providing an enclosure for the protection of the engine men between the rear of the cab and the front of the tender, this space being commonly called the "gangway". Said enclosure must keep out all elements of the weather, but must not be so constructed that the crew cannot escape from the locomotive in a hurry in case this is necessary. Previously known enclosure arrangements have never satisfactorily accomplished this.

It has been the practice up to the time of my invention to make this enclosure in the form of heavy canvas called "winter curtains." The requirement of such curtains has been an expensive one for most of the railroads in this country, largely due to the fact that the lack of uniformity of conditions exists whereby there is a great variation in the space that is to be enclosed between the cab and tender in the various types and classes of locomotives that are in use. Some large railroads have as many as twenty different patterns, or styles, of curtains in order to provide enclosures on the various types of locomotives that are in use on such railroads. As a result, a large number of curtains of every kind must be kept in stock at each terminal of the railroad. This, and the fact that these curtains are frequently burned and torn beyond repair while in use, makes the keeping up of a stock of curtains to comply with the requirements of the Interstate Commerce Commission quite expensive.

On most of the railroads the winter curtain constructions are very similar, although these will vary in minor details, all having two separate side curtains and having a back curtain that closes the opening in back of the cab. Some have an additional outside back curtain, which laps the side curtains near the tender and near the rear end of the hood of the cab, while others omit the outside back cab curtain, and instead have a piece of canvas, sometimes called a hood, that is fastened to the rear of the cab on the outside of the side curtains and encircles both side curtains on the outside and is fastened at the top, hanging loose at the lower end and coming down approximately half way to the deck of the locomotive. Curtains of this type do not keep out the elements of the weather, as the vertically overlapping arrangement causes the laps to open when the wind blows and the curtains will blow back and forth. Also the curtains will be in the way of the fireman in the case of a hand fired engine, and will have raw edges that will begin to wear and are a fire hazard. Furthermore if a hurried exit is required under certain conditions, such curtains are a death trap, as most locomotives provided with the enclosures now in use have nearly twice as much canvas as would be required if the laps and duplications of canvas were omitted, making it difficult to get out of the large amount of canvas provided for the enclosure in case of emergency, which difficulty would be avoided by providing one single thickness of canvas so applied and stayed in the proper places that it will provide an enclosure, which would be much safer than those now in use.

In the winter enclosures now in use, in most cases the curtains reach nearly to the highest point of the cab, where the ventilation is very poor and especially on road locomotives such curtains will hardly last two months, as the tops will be decayed from the action of the gases and smoke at the top part of the cab and new curtains will then be required, or new tops will have to be applied to the curtains, which application of new tops to the curtains is almost as expensive as providing new curtains. The rear ends of most present day side curtains are hung at the top to the hood of the cab on a plumb line with the front of the tender and at the lower ends are fastened rigidly to the tender, as the front end of the tender acts as part of the enclosure. This is poor curtain construction, as when rounding sharp curves, the gangway opening closes. Consequently the rear part of the curtain will drag on the tender, which is by no means a smooth surface, and this will often cause the curtains to tear, or will at least cause these to wear out prematurely.

Another bad feature of the winter enclosures now in use, including the side curtains referred to, is that most railroads have so much canvas in the curtains that are used, that during the summer months the curtains are removed to avoid the inconvenience to the engine men of having all this canvas in the way. The removal of the curtains in the spring and the application of these again in the fall of the year is quite an expense. Furthermore the locomotives often go to the shop for repairs and new curtains are applied, while the old ones that were removed during the summer months are left at some isolated point, and thus are lost, at least as far as their usefulness with that locomotive is concerned. Also sometimes the same thing occurs when locomotives change divisions.

It is an important purpose of my invention to eliminate all these costly defects in the curtain structure now in use for winter enclosures. I accomplish this by applying a hood to the back end of the cab at a desired standard height from the locomotive and tender deck, this height being, preferably, such as to just give head room clearance for a tall person. By providing this depressed, or lowered, hood only one length of curtains for all locomotives will be required and the top ends of all of these will be below the smoke and gas level above referred to, as I ventilate the cab by means of windows above the lowered, or depressed, hood. The curtains that I use will thus last much longer because the same will not be decayed and damaged by the gas and smoke that comes in contact with the curtains now in use. My improved curtains are stayed at the lower ends thereof by various connections to the apron of the locomotive and the tender, which allow all kinds of movements between the locomotive and tender, the mounting and construction of my curtains being such that these will not come in contact with the tender during the swinging movements of the locomotive and tender relative to each other to be torn or worn out thereby. Furthermore by the use of this depressed or lowered, hood, which is part of my curtain, or winter enclosure structure, I eliminate the use of curtains to a great extent, even when the weather is moderately severe, as this depressed hood makes an enclosure in combination with the tender by itself, for the rear opening of the cab as long as the undesirable elements of the weather are coming straight from the rear of the locomotive.

My improved curtain arrangement is particularly desirable with a certain type of cab, which I have described in my co-pending application Serial No. 741,605 filed August 27 1934, of which this application is a division, which has the side window openings greatly reduced in width so that the same cannot be used conveniently for a hasty exit in case quick escape is required from the locomotive, because I provide a quick detachable curtain structure for emergency exit purposes. In present day winter enclosure curtain practice, the detachable connection in said winter curtain arrangement, for providing an exit, is located at the front of the tender instead of at the usual place of exit from the locomotive near the rear wall thereof. In my improved curtain arrangement, instead of having to go to the front of the tender to unfasten the curtains and instead of having to unlatch a large number of snap fasteners, or other similar fastenings of various kinds, my improved curtains unlatch from the rear of the cab just back of the rear wall thereof, close to where both the engineer and fireman are sitting, reducing the number of steps that it is necessary to take to reach this exit. The latching means that I use provides a very simple method of unlatching the curtains, requiring only one hand to raise the latch, which acts as a hand hold, after which a slight angular movement of the curtains is necessary, and a push of the curtain to the rear and the opening for exit is completed, the operator being at the end of the apron right in line with the tender steps to safety, after going through this opening movement of the curtains. This provides an arrangement for a quick exit, that does not increase the number of steps that have to be taken to get off the locomotive, over those that would be necessary, if the curtains were not used at all. Also my improved curtain structure eliminates the common practice in which locomotive crews engage, of tying the curtains together to avoid the gapping of the same in the wind, which is commonly done with curtains now in use, and which makes it absolutely impossible to get out of the winter enclosure quickly when the curtains have been so tied together.

In order to further facilitate safe exit between the cab and tender through the gangway provided between the same under all weather conditions, I have provided means for draining the water from the hood portion and from the main roof portion of the cab, that does not in any manner interfere wtih any of the other appurtenances provided on the cab, the drainage means comprising a down spout, or drain pipe, constituted within and forming part of one of the grab irons, or hand holds, provided on opposite sides of the gangway, this eliminating any ice or water that might render the passage and the steps provided adjacent the passage slippery in cold or wet weather conditions.

It is a further purpose of my invention to provide a mounting for the curtains, above referred to, that will hold the same at their desired position under all angular relationships of the cab and tender. The curtains being partly mounted on the cab, the apron and the tender, it is necessary to provide compensating means in the curtain mounting, whereby the same will be held in a taut condition at all times, with the top and bottom ends thereof in such relationship to the cab and apron as to provide a weather-tight joint at these points, but which will permit swinging of the tender and cab relative to each other, without in any way interfering with the curtain mounting, or in any way damaging the same, and which will also permit movements of the cab and tender toward and away from each other, without in any manner harmfully affecting the curtain mounting, and also further permitting the movement of the tender and cab up and down relative to each other within the limits that occur in practice, without any damage to the curtains or curtain mountings, or any interference with their effective operation.

It is a further purpose of my invention to so mount said curtain-like members that the same can be detached from the cab at their forward ends and moved away backwardly and inwardly to a point adjacent the center line of the locomotive to move the same out of the way when it is desired to obtain a free passageway between the cab and tender through the gangway, previously mentioned. Said mounting comprises stay members that are mounted slidably on a guide member at their upper ends, and certain of which are detachably connected with the cab, and others of which are automatically detachably connected at the bottom thereof with the apron on the cab in such a manner that sliding of the curtains out of closing position will detach the same from said mounting at the bottom thereof. Means is also provided for detaching the curtains from each other at their adjoining portions when it is desired to move the same forwardly to fold the same adjacent the rear of the cab when out of use, for which the usual strap and buckle may be provided. It is also a purpose of the invention to so mount the curtains that the same will not interfere in any way with the activities of the fireman, or others of the crew, in the normal attendance to their duties.

It is another purpose of my invention to provide means for draining water from the cab roof and hood, comprising a pair of hollow tubular vertical grab irons, or grab rods, associated with down-spouts located near the rear outside corner of the cab, said grab irons being secured to the main roof of the cab at the top end thereof and in any desired manner at the bottom end thereof, and cooperating with guttering on the cab roof and hood, so arranged as to discharge water into water catching means provided on said hollow grab irons, or down-spouts.

It is a further purpose of my invention to provide said water catching means in the form of half funnel-like members that are welded to said hollow tubular members, serving as grab irons and down-spouts and to provide numerous small openings in the tubular member within the space enclosed by said funnel-like members to act as strainer members, and to utilize these in combination with larger openings in the lower end of the combination down-spout and grab iron, whereby overflow of the down-spouts will be prevented, due to the fact that nothing large enough to clog the discharge openings can enter into said down-spout, or hollow grab rod. Furthermore said combination hollow grab rods and down-spouts are provided with overflow means on said water catching funnel-like members that are so located that in case there is overflow of the same the water passing from said overflow means will drop at a point spaced from the grab iron so that the grab iron, or grab rod, will not become wet. This is especially important in cold weather when said grab irons, or grab rods, would become icy if water overflowed onto the same, making the same dangerous to use.

It is a further purpose of my invention to provide means for preventing the blowing of the curtains in the wind, comprising open topped pockets, or divisions, sewed to extend vertically in the lower end portions of said curtains so that heavy material, such as coal lumps, may be placed therein to keep the wind from blowing the bottom end portions of the curtains off of the deck of the tender and locomotive. It is desirable to have this material readily removable, as it will not be necessary to place the material in the pockets unless there is a strong wind blowing from one side of the locomotive, and as it is desired to fold the curtains up against the cab when the same are not in use. Accordingly the heavy material, such as the lumps of coal, can be removed from the pockets when said curtains are to be folded up or when it is not necessary to use the same to hold down the bottom ends of the curtains, thus making it easier to handle the curtains.

Other objects and advantages of my invention will appear as the description of the drawings proceeds. I desire to have it understood, however, that I do not intend to limit myself to the particular details shown or described, except as defined in the claims.

My invention is shown as being applied to a locomotive that has a boiler 40, the term boiler being applied to the steam and water containing portion and the fire box portion as a unit. As is well known, the fire box portion of this boiler extends well into the cab of the locomotive, the cab extending over and around the sides of said fire box portion. The cab is shown as having the usual deck 41, apron 42, which is hinged at 43 to the cab, rear wall portions 44, providing an opening between the same, through which entrance is obtained to the cab, a floor 45 adjacent the seats 46 for the engineer and fireman, a front wall 47, a side wall portion 48 and a roof 49.

Figures 1, 2, 14, 18, 19, 20:
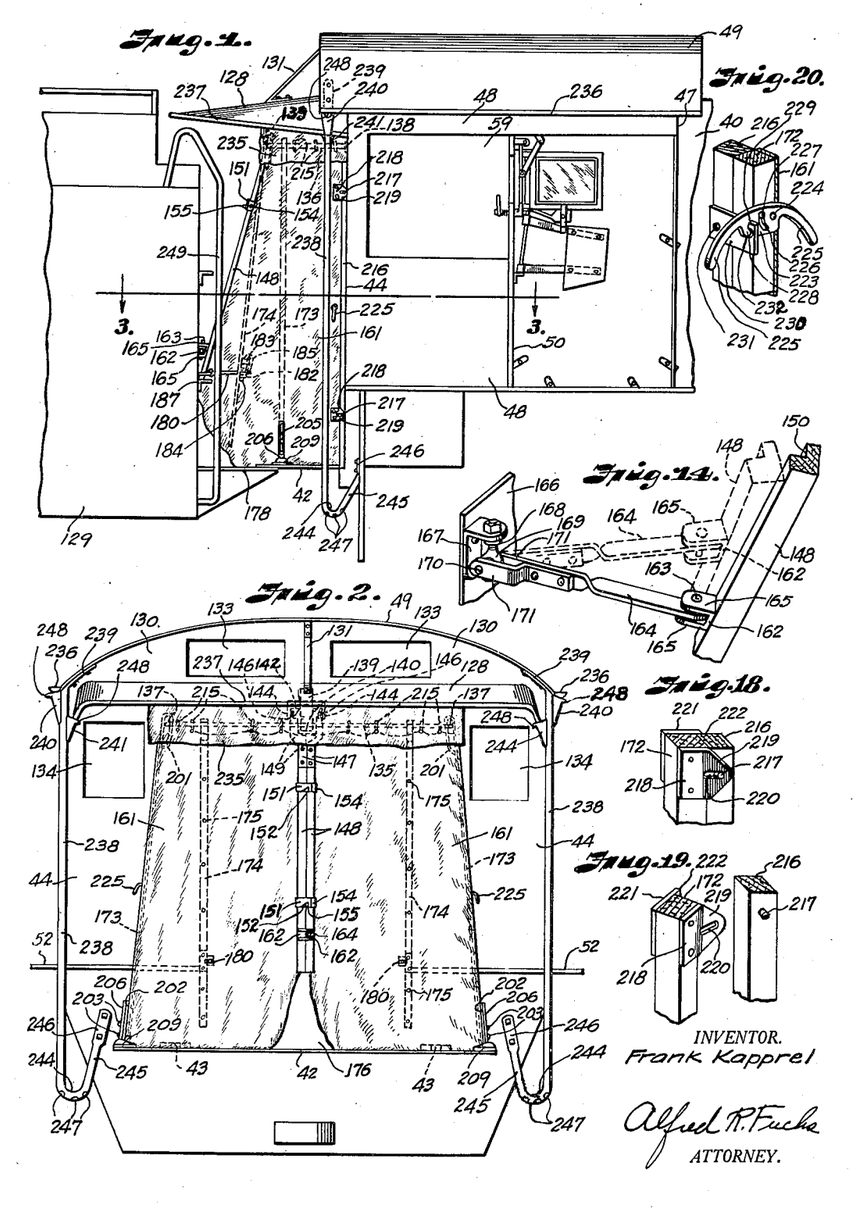
Fig. 1 is a view in side elevation of a portion of the locomotive and tender to which my invention is applied.
Fig. 2 is a rear elevation of the locomotive cab, the tender being omitted.
Fig. 14 is a fragmentary perspective view of the lower end portion of one of said central stay members and the means for connecting the same with the tender.
Fig. 18 is a fragmentary perspective view of one of the front stay members and the means on the cab cooperating therewith, showing one of the separable fasteners comprising part of the quick detachable connection between said front stay member and the cab, with the parts shown in engagement.
Fig. 19 is a similar view showing the position of the stay member and the member with which it cooperates on the cab just prior to engagement of the separable fastening elements.
Fig. 20 is a similar view of the stay member and cooperating member on the cab and the locking means for holding the stay member in engagement with the cab.
Figures 3, 4, 7, 8, 9, 10, 11, 12, 13:
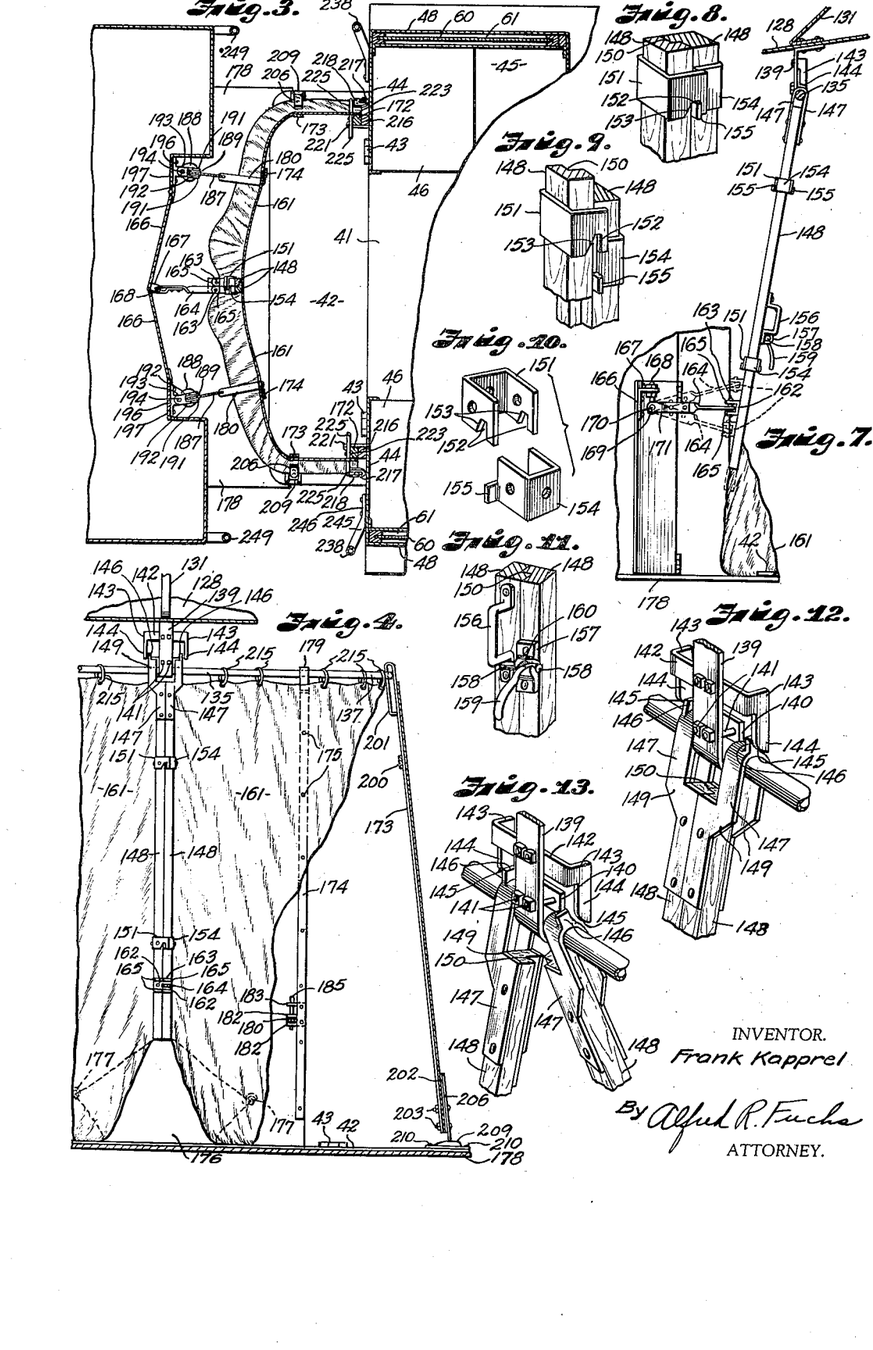
Fig. 3 is a fragmentary horizontal section of the rear portion of the cab and the front portion of the tender.
Fig. 4 is a fragmentary view partly in elevation and partly in vertical section of the curtains forming part of my invention, portions of the tender and hood on the cab being shown in section therein.
Fig. 7 is a view partly in side elevation and partly in section of the central curtain mounting, the curtain being broken away.
Fig. 8 is a fragmentary perspective view of the cooperating pair of central stay members showing the locking means, for holding the same in engagement, in locking position.
Fig. 9 is a similar view showing said means unlocked.
Fig. 10 is a perspective view of the locking means detached, but with the locking means in their relative positions ready to be moved into locking engagement.
Fig. 11 is a fragmentary perspective view of said cooperating stay members, showing the operating means for manipulating the same.
Fig. 12 is a fragmentary perspective view of the upper end portions of said pair of stay members and the means for holding the same in position at the center of the guide rod, with the parts in locked position.
Fig. 13 is a similar view showing one stay member moved into position to be disengaged from the locking means.

In the form of the invention shown in Figs. 1 and 3, the front wall 47 is not made so as to extend straight across the entire front of the cab, but a portion of the front wall, which is designated as the forward wall portion 50, is set back from the front end of the cab a considerable distance, thus providing an offset in the cab.

It will be noted that with the offsetting of the wall 50, so as to set the same back a considerable distance from the front of the cab, the window opening 59 is greatly reduced from that usually provided in locomotive cabs at the present time, and inasmuch as the window opening is frequently used as an exit in case of emergency by the engine crew, it is necessary to provide other means of exit of a more satisfactory character than has been previously provided at other points when such a front wall portion 50 is utilized, set back from the front end of the cab. While curtains to protect the crew from the weather have been required by Interstate Commerce Commission rules in locomotive cabs at the rear thereof, and various curtained arrangements have been tried to more thoroughly protect the crew from the weather, than will result without the use of such curtains, the curtain arrangements have been generally unsatisfactory, because these have not served the purpose of protecting the crew unless these were so used as would render the same dangerous from the standpoint that these would interfere with the quick exit of the crew from the cab through the gangway provided between the cab and the tender.

In order to increase the safety of operation of the locomotive by providing for greater safety of the crew itself while operating the locomotive, I have provided means forming part of the enclosure of the cab, comprising curtains and means for mounting and holding the curtains, whereby the same can be quickly released for purposes of providing an emergency exit, which curtains provide a much better enclosure for the cab when such is desirable, than has been previously possible without sacrificing the safety of the crew. Thus when the window at the side of the cab is closed, and the closure for the front wall is utilized to completely close the cab at the side and forward walls thereof, my improved curtain arrangement serves to provide a substantially weather-tight compartment within the cab for the crew. In order to make this compartment weather-tight without undue complications, I have also provided a depressed hood portion on the rear part of the cab, which cooperates with the tender to reduce the space between the tender and the cab to reduce the necessity of using the curtained enclosure under certain weather conditions, and which cooperates with the curtained means to provide a weather-tight enclosure when such is actually needed.

The hood 128 is depressed a considerable distance below the roof 49, as will be evident from Fig. 1, and extends backwardly from substantially the rear wall portions 44 of the cab to a point such that the tender 129 is slightly overlapped by the hood. The rear wall portions 44 are joined by a top rear wall portion 130, which extends above the hood 128 to the roof 49, said roof 49 overlapping to some extent, the hood 128, and said hood being secured to the wall portion 130 by means of a bracket 131 at the center thereof, and and to the wall portions 44 by any suitable means. The hood 128 is located at a standard height from the apron 42 of the locomotive, the height of the wall 130 and of the roof 49 above the hood 128 varying in accordance with the over-all height of the cab of the locomotive to which my improvements may be applied. I, preferably, provide a pair of window openings 133 in the wall 130 so that the cab can be ventilated therethrough when desired, and similar window openings 134 in the wall portions 44, siutable closure members being provided for said openings 133 and 134.

My improved curtain enclosure means has the general characteristics of being detachably connected with the cab at its forward ends and extending backwardly and inwardly toward the tender and the center line of the locomotive and tender to form an enclosed space, and, preferably, comprises a pair of members that are detachably connected together at about the center line of the locomotive, and which are movable into a position adjacent said center line when the same are to be moved out of the way to provide free passageway through the gangways provided on opposite sides of the locomotive between the tender and cab. The mounting for said curtain means comprises an upper supporting means that is made in the form of a guide bar, or rod, which may be either solid or a tubular member, as may be preferred, and which has a rear transversely extending portion 135, and substantially longitudinally extending portions 136 connected with the transversely extending portion 135 by means of curved portions 137, the portions 136 extending to the rear wall portions 44 and being mounted on suitable supporting brackets, or flanges, 138 provided on said wall portions 44.

The central portion of the transversely extending portion 135 of this upper curtain supporting member is mounted on a bracket 139, which is secured to the hood 128 immediately below the bracket 131, said brackets 139 and 131 being, preferably, secured together by securing means extending through the same and through said hood 128 to thus make said bracket 139 substantially an extension of the bracket 131. The bracket 139 is shown more in detail in Figs. 7, 12, and 13. Said bracket comprises a U-shaped lower end portion 140 receiving the guiding and supporting member 135, the member 135 being secured in position in the U-shaped end portion of the bracket 139 by means of the bolts 141.

Mounted on the bracket 139 is a keeper member 142 that has a transverse portion bolted to said bracket 139 above the U-shaped portion 140, which is provided with ears 143 on the ends thereof, provided with depending fingers 144, which are provided with tapering end portions by providing a curved edge 145 on each thereof on the side of the same that faces the bracket 139. The ears 144 act as keeper members, or stop members, for engagement by lugs 146, which are provided on the U-shaped bracket members 147 that are secured to the upper ends of the stays, or bars, 148. Thus when the bars 148 are in the position shown in Fig. 12, which is also that shown in Fig. 7, or in which the lower ends thereof are inclined outwardly away from the cab toward the tender, the lugs 146 will be engaged with the fingers 144 upon any attempt to separate the members 148 beyond a certain limit. The members 148 are slightly slidable from each other when in the position shown in Figs. 7 and 12, provided the means for holding the same in engagement with each other, which will be described below, are released, but a member 148 cannot be moved away from its position more than a very short distance without swinging the same from the inclined position thereof to a substantially vertical position shown for the one member 148 in Fig. 13, whereupon the lug 146 will move out of alignment with the keeper 144 and the same can be moved past said keeper 144 and the U-shaped bracket 147 slid along the guide and supporting member 135 to any position desired.

The U-shaped bracket members 147 are offset, as indicated at 149, in order to space the upper portions of the adjoining members 147 from each other sufficiently to clear the bracket 139. The lower portions thereof are secured in any desired manner to the members 148, and one leg thereof is somewhat narrower than the other leg to conform to the shape of the member 148, said members 148 being reduced by providing a rabbet 150 therein on opposite faces thereof, so that the same will interfit, as shown clearly in Figs. 8, 11 and 12, thus holding the same from any movement at right angles to the direction of extent of the guide rod 135 when locked together.

The means for locking the members 148 to each other against any relative movement, comprises pairs of members, each pair comprising a U-shaped bracket member 151 having notches, or recesses, 152 in the legs thereof, one edge 153 of which is inclined, and each pair further comprises a U-shaped bracket member 154, which has lugs, or ears, 155 projecting laterally from the legs thereof. Said bracket members are utilized in pairs, and preferably, two such pairs are provided, one near the top and one near the bottom of the members 148. It will be obvious that the lugs 155 can be engaged with the notches 152 by a longitudinal sliding movement of the members 148 relative to each other. Thus by moving the members 148 from the position shown in Fig. 9 to that shown in Fig. 8, the lugs 155 will engage with the notches 152.

A handle member 156 is provided on that member 148 upon which the bracket members 154 are mounted, and a bracket 157 is provided on the other member 148, a bolt-like member 158 being rotatably and slidably mounted in a bore in said member 157. A handle 159 extends from the bolt 158 through a cam slot 160, the handle 159 being rigid with the bolt 158. The bolt 158, it will be noted upon reference to Fig. 11, extends under the handle 156 when the parts are in the position shown in Fig. 11. Upon raising the handle member 159 upwardly the bolt 158 is rotated and also moved to the right, due to the cam slot 160, and is withdrawn from under the handle 156. The member 148, which carries the brackets 151, can then be lifted upwardly, as shown in Fig. 9, off the lugs 155, disengaging the members 148 from each other. The handle 156 and the handle 159, are, of course, provided on the rear side, or the side toward the cab, of the members 148, as will be obvious from Fig. 7. It will be noted that the U-shaped bracket member 151 is wider than the bracket member 154 and overlaps the same. Thus when the bracket members 151 and 154 are in interlocking position, the members 148 are substantially a unit, being immovably secured together against separation and longitudinal sliding movement.

The curtains are indicated by the numeral 161, there being a pair of said curtains, and a member 148 being secured to each curtain 161 so that said members 148 define the adjoining edges of the curtains 161 at substantially the center line of the locomotive and tender. As previously pointed out, the members 148 are mounted so that these can slide and swing on the guide rod 135, but that the sliding movement thereof will be extremely limited due to the contact of the lugs 146 with the stop fingers 144, and that the lugs 146 will always engage with said stop members unless the members 148 are swung to a vertical position, which is that position shown at the right of Fig. 13. While the members 148 are in curtain holding position, such as that shown in Figs. 7 and 12, however, the said members 148 will never approach a vertical position, the same being inclined outwardly in a rearward direction, or toward the tender, at their lower ends, in order that the curtains 161 will flare outwardly at their lower ends to provide sufficient space for the fireman to perform his duties in connection with the removal of coal from the tender and firing the locomotive.

Near their lower ends the members 148 are provided with U-shaped bracket members 162. One of these is, preferably, provided on each of the members 148, but only one thereof is utilized at a time, as it is only necessary to secure one of said members 148 to the tender in order to hold both of the same in position, due to the fact that both are firmly secured together. However, in case only one curtain is utilized and the other is detached, as might sometimes be the case, one of said U-shaped brackets is provided on each of said members 148. The brackets 162 are provided with a pair of aligning ears, which have openings therein for a pivot member 163, which extends through a pivot opening in the link 164. The ears are indicated by the numeral 165 and these are spaced far enough apart that the link 164 will have sufficient play between the two ears 165 that it can move to different angular relationships to the bracket 162, as indicated in Fig. 7 in dotted lines, that is, either vertically above or below the full line position shown in Fig. 7.

The tender 129 is provided with coal gate members 166, one of which has an angular bracket 167 provided thereon, upon which is mounted a swivel member 168 having an eye 169 thereon, to which are pivotally secured, by means of the pivot member 170, pivot ears 171 on the link 164, the link being twisted so that said ears extend substantially at right angles to the main body portion of the link 164. The swivel being pivoted to turn on a substantially vertical axis and the link 164 being pivoted on the swivel member 168 on a substantially horizontal axis, a substantially universal connection is provided between the link 164 and the coal gate by this arrangement, thus permitting the swinging of the link 164 to various vertical and horizontal angles, as may be necessary for relative movements of the tender and cab of the locomotive, the guide 135 being rigid with the cab, this is necessary in order to prevent any damage to the curtains 161 due to such movements. The curtains are secured to the members 148 at regular intervals throughout the length thereof from top to bottom of said members 148. The members 148 constitute stay members for the adjoining edges of the curtains. Stay members are also provided at points along said curtains, comprising the front stay members 172, which are provided at the forward vertical edges of the curtains, (see Fig. 3), the intermediate stay members 173, and the intermediate stay members 174. The stay members 174 are provided with a compensating connection with the tender, which is shown in Figs. 3, 15, 16 and 17. Said stay members 174 are provided on the inner faces of the curtains 161, being riveted thereto at regular intervals, as indicated at 175.

It will be noted that the stay members 148 terminate at a considerable distance above the lower ends of the curtains 161. This is done so that a V-shaped opening 176 can be provided between the curtains 161 by fastening the lower corners thereof up, as indicated by the dotted lines in Fig. 4, the same being held in this position by any suitable detachable fastening elements 177. The stay members 174 are longer, but also do not extend down to the deck 178 of the tender, this being done so that in the movements of the tender up and down relative to the cab of the locomotive, the stay members 174 will not engage with the deck 178 so that these, or the curtains 161, might be damaged due to such engagement. The stay members 174 are, preferably, in the form of metal strips, as will be clear from Figs. 16 and 17. The upper ends thereof are formed into an elongated eye 179, which is slidably mounted on the transverse portion 135 of the guide member and will have vertical movement relative thereto in case that such a great movement of the tender should take place that the bottom end of the member 174 engages with the deck 178. An opening is provided in the curtain 161 adjacent the member 174, spaced a short distance from the bottom of the member 174, and a link 180 passes through this hole, or opening, in the curtain member 161.

The link 180 comprises a portion of a universal compensating connection between the tender and the stay member 174, which is detachably connected with the stay member and which, when connected with the stay member, not only permits movement of the stay member toward and away from the tender, but limits movement of the stay member toward the tender in such a manner that the stay member is held far enough away from the tender that no damage can be done to the stay member, or the curtain, by the same being in any manner jammed between the tender and the cab. The means for connecting the link 180 to the stay member comprises the bracket 181 mounted on the stay member 174, which is provided with two closely adjacent pivot ears 182, and one ear 183 spaced at a somewhat greater distance from the next adjacent ear 182, than these are spaced from each other.

A slidable bolt-like member 184 extends through the ears 183 and 182 and the same terminates in a handle portion 185 that has a curved, reduced, somewhat resilient end portion 186 that is adapted to engage with one of the ears 182, or the ear 183, to either hold the member 184 in locking position, or in unlocked position, as may be desired. The member 184 passes through an opening in the end of the link 180 when in the position shown in Figs. 15 and 16. Secured to the opposite end of the member 180 from that connected with the bracket 181, is a flexible member 187, which may be a cable, and which has a weight 188 secured to the other end thereof, said cable running over a pulley 189 mounted on a shaft 190, extending between the ears 191, provided on a bracket member 192, which bracket member also has a pair of ears 193 thereon through which the pivot pin 194 extends, which is rotatable in an opening provided in the ears 195, provided on the bracket 196, which is secured in any desired manner on the wall portion 197 of the tender adjacent the coal gate 156. The bracket 192 is swingable about a substantially vertical axis and the link 180 and cable 187, in cooperation with the pulley 189, provide for any swinging movements of the member 174 about a horizontal axis. Also due to the provision of the weight 188 and the flexible member 187 the stay 174 will adjust itself so that the curtain 161 will always be held in a taut, or unbuckled, condition, no matter what angular position the tender may assume relative to the cab about either a vertical or horizontal axis, an alternative position of the parts upon such swinging movement being shown in dotted lines in Fig. 17 and in Fig. 15. There will, of course, be come flexing of the curtain 161 below the bottom end of the stay 174, and in order that close contact will be provided between the curtain 161 and the deck 178, or the apron 42, pockets are provided at 198 along the lower edge portion of the curtain 161, into which lumps of coal or other weights 199 may be inserted to hold the bottom edge of the curtain in engagement within said deck or apron.

Figures 5, 6, 15, 16, 17, 21, 22, 23, 24:
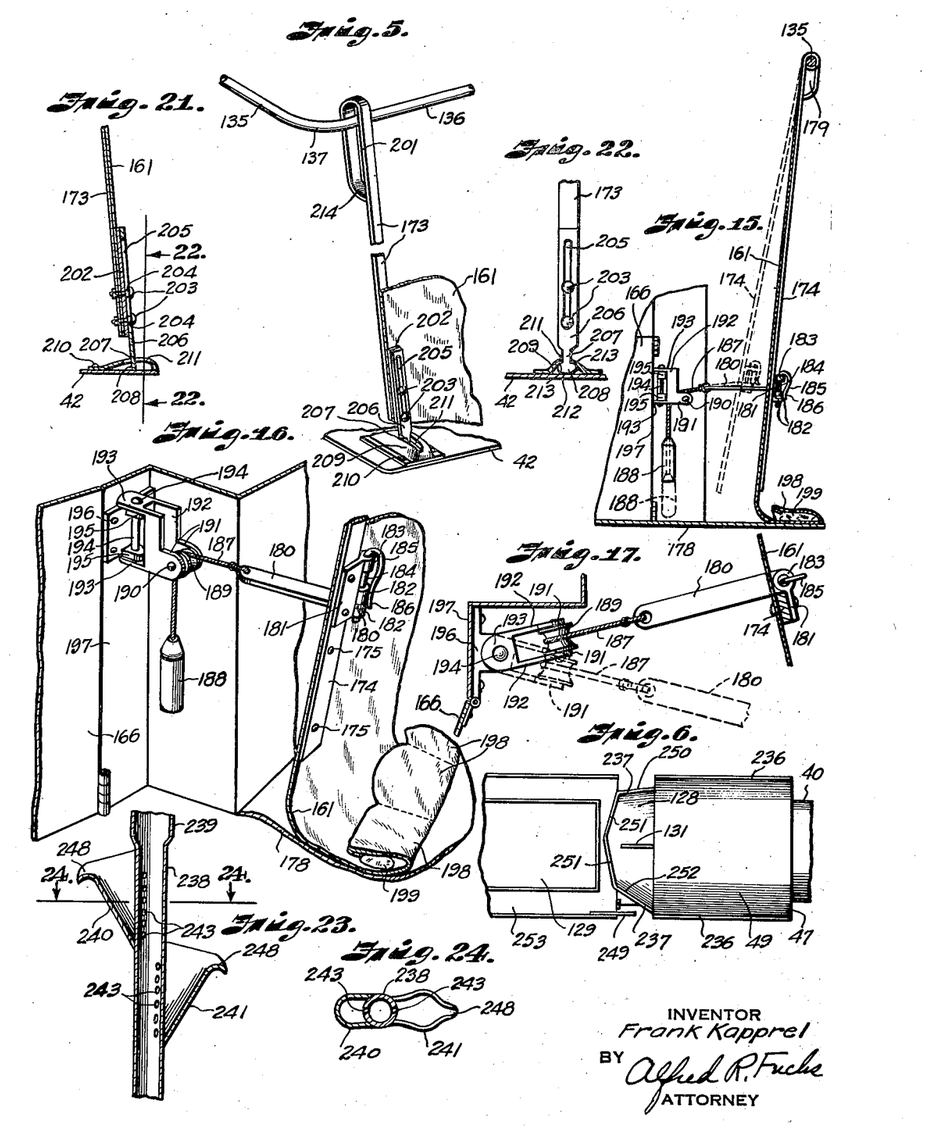
Fig. 5 is a perspective view partly broken away, of an intermediate stay member, a portion of the guide rod with which it cooperates and the connecting means whereby said stay member is automatically disengageable from the apron on the locomotive, a fragment of the curtain being also shown.
Fig. 6 is a reduced fragmentary plan view of the rear portion of the locomotive and forward end portion of the tender.
Fig. 15 is a vertical sectional view through one of the curtains adjacent a stay member, showing the compensating connection between the same and the tender, a fragment of the tender being shown partly in elevation and partly in section.
Fig. 16 is an enlarged fragmentary view partly in perspective and partly in section of the curtain and tender, showing said compensating connecting means.
Fig. 17 is a fragmentary plan view thereof, showing an alternative position of the parts in dotted lines.
Fig. 21 is a fragmentary sectional view of the lower portion of said stay and the connecting means between the same and said apron.
Fig. 22 is a section taken substantially on the line 22—22 of Fig. 21.
Fig. 23 is a fragmentary vertical sectional view of the upper portion of the down spout for draining the cab roof and hood.
Fig. 24 is a section taken substantially on the line 24—24 of Fig. 23.

The stays 173 are also made of metal, but these are not secured to the curtains 161 except near the lower ends thereof and at one other point, and at such points are secured in such a manner as to permit relative movement of the curtains and the stays. Straps 200 are provided, which are secured to the inner face of the curtain at spaced points to provide a loop through which the stay member 173 is slidably engaged. The upper end of each stay member 173 is provided with an elongated loop 201, which engages normally with the longitudinally extending portion 136 of the guide rod. The lower end of the curtain 161 is clamped to the member 173 by means of a wear plate 202, which is secured thereto by means of the bolts 203, said bolts 203 having squared portions 204 under the heads thereof, which are slidably received in a slot 205 in a link 206, said link 206 having a reduced portion 207 at the lower end thereof and a head 208 beyond said reduced portion. The reduced portion 207 and head 208 of the slidable link 206 are engageable with a keeper 209, which is secured to the apron 42 on the locomotive in any desired manner, as by means of the screws 210 engaging the lateral flange thereon. The keeper member 209 is hollow and has a slot 211 therein that is elongated sufficiently in one direction that the head 208 on the member 206 can be passed therethrough and is of such width that the reduced portion 207 can be readily passed therethrough, but is of much less width than the head portion 208 so that the parts will be interlocked, as shown in Fig. 22, when the parts are in their normal position, with the curtains in enclosing position. It will be noted that the upper face of the member 209 is rounded so that no obstruction is presented thereby over which a person might trip the inner end sloping gradually upwardly from the flange thereon to the slotted top portion thereof to avoid any abrupt projections on the apron 42. The lower part of the head 208 is rounded, as indicated at 212, as are also the shoulders 213 between the head 208 and the neck portion 207 so that rocking movement of the member 206 in the socket provided by the member 209 can be obtained.

It will be obvious that the lower end of the member 206 can rock in all directions in the socket 209 as movements of the apron 42 to various angular positions, due to movements of the tender relative to the cab, take place, and that under ordinary conditions the elongated eye 201 will take care of any up and down movement that takes place, the member 173 sliding through the loop provided by the strap 200 to permit this up and down movement of the member 173. Should the member 173 be moved upwardly so far, however, that the bottom inturned end 214 of the eye engages with the guide rod, any further movement will be taken up by the sliding connection between the member 206 and the stay member 173, the wear plate 202 preventing any damage to the curtain 161.

The arrangement described also comprises an automatically detachable connection between the curtain and the apron of the locomotive, operable upon sliding the curtain aside to obtain a free passage between the cab and the tender when this is desired. It will be seen that when the eye portion 201 on the member 173 is moved around on the guide rod from the portion 136 around the curved portion 137 to the portion 135 thereof, the portion 135 extending at right angles to the portion 136, the head 208 will be turned to a position perpendicular to that shown in Fig. 22, and any further movement of the member 173 along the portion 135 of the guide rod will pull the head 208 out through the slot 211, automatically disengaging the curtain from the apron 42. When it is desired to engage the curtain with the apron at the socket 209, it is necessary to place the head 208 in the slot before moving the eye 201 from the portion 135 of the guide member to the portion 136 thereof, or before rounding the curved portion 137. Upon doing this and sliding the guide portion 201 around the curved portion 137 to the portion 136 the keeper member 209 and the stay 173 will be interlocked.

The curtain members 161 are never disengaged from the guide member having the portions 135, 136 and 137, and in order to hold the curtains 161 closely adjacent the guide member, rings 215 are provided at spaced intervals in the upper edges of the curtains, which slidably engage the guide rod, the same being located between the stays, as will be obvious. The stay members 172 are provided with separable fastening means for connecting the same with vertically extending bars 216 provided on the rear wall of the cab at each side thereof, said separable fastening elements each comprising a pin 217 on the member 216 and an ear 218 on the member 172, there being, preferably, two pairs of said separable fastening elements for each stay member 172. The ears 218 are secured to the outer faces of the members 172 and have the portions thereof that extend beyond said stays 172 toward the cab bent outwardly, as indicated at 219, at an oblique angle, and such angular portions are each provided with a slot 220, with which the pins 217 are adapted to engage.

Each member 172 is provided with a plate 221 on the opposite face thereof from the bracket 218, which projects edgewise beyond the member 172 toward the member 216 so as to provide shoulders on the members 172 at 222, overlapping the inner faces of the members 216. To engage the members 172 with the members 216 in interlocking relation, the slotted portions of the brackets are first passed over the pins 217 with the member 172 at an angle to the member 216, such as shown in Fig. 19, then the member 172 is swung around relative to the member 216 to the position shown in Fig. 18, whereupon the plates 221 engage with the inner faces of the members 216.

Means is provided for holding the parts described above in the relationship shown in Fig. 18 and for quickly releasing the same from such relationship, said means comprising a pivoted locking lever 223, which is pivoted to the member 172 at 224, and which has handle members 225 at opposite ends thereof so that the same can be operated from either the inside or the outside of the curtain 161. The member 223 is provided with an arcuate slot 226, through which a headed guide pin 227 extends, said guide pin limiting the movements of the lever into and out of locking position. A locking finger 228 is provided on the locking member 223, and said locking member is provided with a slot 229, which is adapted to receive a locking plate, or flat bolt member, 230, which is fixed to the member 216 by the securing elements 231. A recess, or indentation, 232 is provided in the plate 230 to receive the locking finger 228.

When the parts are in the position shown in Fig. 20 the member 172 will be held from movement outwardly away from the member 216, and also from any angular movement relative thereto so that the members 217 will be held in locking engagement with the ears 219 while said locking member is in such position. The locking member, however, also acts as easy and quickly separable means for releasing the separable fastening means for this stay member 172. All that is necessary to release the member 172 is to raise the handle 225 on the inside of the curtain, or depress the handle 225 on the outside of the curtain. The necessity for hasty operation thereof will always take place on the inside. Accordingly all that is necessary to release the member 172 is to raise the handle 225 on the inside of the curtain 161, which will immediately unlock the member 223 from the keeper 230, and a slight angular movement of the member 172 in an outward direction away from the member 216 will immediately release the member 219 from the pin 217, this being all accomplished by means of the handle 225 by substantially a single movement of the operator, whereupon the handle can be utilized to swing back the curtain as far as desired, and when the curtain is swung around past the turn 137 in the guide member, the member 173 will automatically release itself so as to provide a wide, free passage in the gangway between the tender and the cab for hasty exit therethrough. This same arrangement is provided on both sides of the cab and easy exit can be obtained on either side thereof, as will be obvious.

The pair of curtains 161 does not form a completely tight enclosure below the hood and between the rear of the cab, the hood and the deck of the tender, or apron of the cab, due to the fact that the guide rod must be spaced from the hood a certain distance and this space must be closed in some manner. A short depending curtain 235 is provided for this purpose, which is secured to the under side of the hood in sufficiently spaced relation to the guide member to permit free sliding movement of the rings 215 and the loops on the stays on said guide member and extending down sufficiently far over the curtains 161 that the overlap will prevent any entrance of snow, rain or cold wind between the curtain 235 and the curtains 161. The curtain 235 does not need to be adjustable, or movable, but can remain in position at all times.

In order to assure safety or exit through the gangway under bad weather conditions it is desirable to provide drainage means for the hood 128 and the roof 49. A gutter 236 is accordingly provided on the roof 49, and a gutter 237 is provided on the hood 128. It is necessary to provide hand holds, or grab irons, on both sides of the gangway, and the grab iron 238 provided on the cab is made in the form of a tube, or pipe, which has a flattened end portion 239 that is riveted to the inner face of the roof 49. Said hollow grab iron 238 comprises a down spout for receiving the water from the gutters 236 and 237. Means for catching the water from the gutters is provided, comprising the funnel-like laterally projecting members 240 and 241 adjacent the upper end of said down spout 238. Said members 240 and 241 flare upwardly to provide wide mouths thereon projecting laterally of the curved side wall of the tubular member 238, which is provided with a plurality of perforations 243 at the funnel-like members 240 and 241, through which the water is discharged into the tubular member 238.

The grab iron 238 is provided with a curved portion 244 adjacent the bottom thereof, and an upwardly inclined portion 245, which is secured to the cab in the usual manner, as by providing a flat end thereon at 246 that is riveted to a cross piece on the cab. Openings 247 are provided in the lower portion of the curve 244 for discharge of water at one side of the gangway below the apron on the cab. The openings 243 are made much smaller than the openings 247, thus preventing any clogging of the pipe, or tubular member, 238. Depressed lips 248 are provided on the flaring portions 240 and 241 so that if any overflow of water from these water catching members 240 and 241 should take place, the discharge will occur away from the grab iron 238 so that it will not become wet or icy, due to such overflow. The grab iron 249 on the tender is made in the usual manner that is now customary.

The hood 128 is shown in plan in Fig. 6. It is not shaped in the manner in which hood portions now provided on locomotive cabs are usually shaped, which are mere extensions of the roofs of such cabs. The hood 128 is, preferably, inclined slightly inwardly in a rearward direction on the left-hand, or fireman's side of the cab, as indicated at 250, and then inclines inwardly toward the center thereof much more sharply, as indicated at 251. A similar inclined portion 251 is provided on the opposite side of the hood 128, but it does not extend as far sidewise from the center line of the locomotive, and a more decidedly inwardly inclined portion 252 is provided on the right-hand side of the hood, or engineer's side. The hood is tapered, or inclined, in this manner in order to prevent any striking of the same against cars on adjacent tracks, or buildings that may not have the desired clearance adjacent a curve, around which the locomotive may be passing. The portion 252 is cut away more than the portion 250 in order that more protection can be given the fireman, who is usually stationed under the hood, when in the act of firing the locomotive, and a passage can be provided on the other side thereof outside the hood and curtain arrangement to a walk-way 253 frequently provided on tenders for other members of the crew, such as brakemen, that sometimes occupy cupolas on tenders.

I claim:—

1. In a locomotive, a cab, a tender having a deck, a pair of combination side and back curtains detachably connected with the rear of said cab to provide exits between the forward edges thereof and said cab, said curtains extending rearwardly a predetermined distance and then inwardly toward each other to provide an enclosure for the opening at the rear of the cab and including the required portion of the tender deck necessary for the operating duties of the engine crew when protection from the weather is desired, the adjacent edges of said curtains being stayed, and means for detachably connecting the edge of one curtain to the adjacent edge of the other curtain, said edges being engageable with and disengageable from each other by a relative sliding movement of said edges.

2. In a locomotive, a cab having a roof, a rear wall, a hood depressed below said roof extending rearwardly from said rear wall, a tender, a gangway between said tender and cab, and drainage means for said roof and hood comprising a hollow grab rod adjacent said gangway.

3. In a locomotive, a cab having rear wall portions spaced from each other to provide an opening therebetween, a deck, a hood and means for closing the space between said deck, hood and rear wall portions, comprising a pair of curtains, means for slidably supporting the upper ends thereof, means for securing said pair of curtains together, and means for detachably securing the forward ends of said curtains to said cab, said means comprising a single operating element extending both from the inner and outer sides of said curtains for releasing said curtains from said cab from either inside or outside said enclosure.

4. The combination with a locomotive and tender, of a cab having an opening in the rear thereof and means for closing said opening, comprising a pair of curtains, means on said cab for supporting the upper ends thereof, means detachably securing one vertical edge of each curtain to said cab, means securing the adjacent vertical edges of said curtains to each other, means securing certain lower portions of said curtains to said tender and means swingable about a plurality of axes providing self-adjustment of said curtains upon relative motion of said tender and cab.

5. The combination with a locomotive and tender, of a cab having an opening in the rear thereof and means for closing said opening, comprising a pair of curtains, means on said cab for supporting the upper ends thereof, means detachably securing one vertical edge of each curtain to said cab, means securing the adjacent vertical edges of said curtains to each other, and means securing certain lower portions of said curtains to said cab, said curtains being slidably mounted on said means on said cab, and said means securing the lower portions thereof to the cab comprising a connection automatically releasable upon sliding one curtain toward the other after detachment of said vertical edge from said cab.

6. The combination with a locomotive and tender, of a cab, and means providing an enclosure at the rear thereof, comprising a pair of curtains, and means for supporting said curtains in a downwardly and outwardly inclined position comprising a plurality of stay members mounted on said curtains, rod-like guiding means on said cab slidably carrying the upper ends of said stay members, means on said cab and said tender to which said stay members are secured near their lower ends and means at both ends of said stays compensating for the movements of said tender and cab relative to each other, to allow free movement of said engine and tender relative to each other without straining said curtains during normal operating conditions.

7. In a locomotive, a cab, an enclosure at the rear of said cab comprising a pair of flexible members each carrying means for detachably securing the same at its forward edge to the rear of said cab, said means being releasable with one hand and comprising an operating member for releasing said securing means and moving said flexible member and means for mounting said flexible members so that each thereof may be moved rearwardly with one hand by said operating means to provide an exit from said locomotive.

8. In a locomotive, a cab having rear wall portions, said rear wall portions being spaced to provide an opening therebetween, a roof on said cab and a rigid hood on said cab at the rear end of said roof depressed below the same and extending rearwardly therefrom, said hood extending downwardly into said opening a predetermined distance to reduce said opening to a standard height.

9. In a locomotive, a cab having a roof, a tender, a gangway between said tender and cab, and drainage means for said roof comprising a hollow grab rod adjacent said gangway.

10. In a locomotive and tender, a cab adapted to be completely closed having a forward wall, a side wall having an opening therein much narrower than the length of said cab, said locomotive having a gangway between the cab and tender and an enclosure for the rear of said cab comprising curtains, means operable with one hand to release said curtains from the rear of said cab, and means for securing the lower ends of said curtains to said locomotive rearwardly from the rear end of said cab automatically releasable upon moving said curtains away from the rear end of said cab to provide easy exit means adjacent the rear end of said cab at said gangway.

11. The combination with a locomotive cab and tender of means for enclosing the space between said cab and tender, comprising a pair of curtains extending from said cab rearwardly and inwardly toward each other, means detachably connecting the adjacent edges of said curtains with each other, means quick detachably connecting the forward edges of said curtains with said cab, and means for releasing said connecting means from either inside or outside said enclosure.

12. In a locomotive, a cab having a roof and a rigid, fixed hood at the rear thereof depressed below said roof and extending rearwardly therefrom, said hood having side edges tapering inwardly toward the rear of said hood.

13. In a locomotive, a cab having a roof and a hood at the rear thereof depressed below said roof, a gutter on said hood, a gutter on said roof, a hollow grab rod forming a down spout and water catching members on said grab rod below said gutters.

14. In a locomotive, a cab having a roof and a hood at the rear thereof depressed below said roof, a gutter on said hood, a gutter on said roof, a hollow grab rod forming a down-spout and water catching members on said grab rod below said gutters, having overflow means discharging at points spaced from said grab rod.

15. In a locomotive, a cab having a roof, said cab having an opening in the rear thereof, a hood depressed below said roof at the rear end thereof to reduce the opening in the rear of said cab, curtains located below said hood and providing an enclosure at the rear of said cab below said hood, a rear wall portion on said cab extending between the forward end of said hood and the rear end of said roof and ventilating means in said rear wall portion above said hood, whereby smoke and gases are ventilated from said enclosure above said curtains.

16. In a locomotive, a cab, a tender having a deck, an apron on said locomotive, a stayed curtain structure providing an enclosure at the rear of said cab, means for connecting said curtain structure to said cab at the top thereof for limited movement relative to said cab, and means for connecting said curtain structure at the bottom thereof to said deck, said apron and said tender for limited movement relative to said deck, apron and tender respectively.

17. In a locomotive, a cab, a tender, a stayed curtain structure providing an enclosure at the rear of said cab, means for connecting said curtain structure to said cab at the top thereof for limited movement relative to said cab, and means for connecting the lower portion of said curtain structure to said tender for movement toward and away from said tender and transversely and vertically relative thereto.

18. In a locomotive, a cab having rear wall portions, and an enclosure at the rear of said cab comprising a pair of curtains, each detachably connected with one of said rear wall portions, said curtains extending rearwardly toward each other, and means for securing the adjacent portions of said curtains together, comprising a stay member extending along each of the adjacent edges of said curtains, rod-like means slidably receiving the upper ends of said stay members, means holding said stay members in an inclined position and inter-engaging means on said rod-like means and stay members holding said stay members against sliding movement on said rod-like means while in such inclined position.

FRANK KAPPREL.